(12) United States Patent
Mohri et al.

(10) Patent No.: US 9,368,818 B2
(45) Date of Patent: Jun. 14, 2016

(54) HUMIDIFICATION CONTROL METHOD FOR FUEL CELL

(71) Applicant: HONDA MOTOR CO., LTD., Minato-Ku, Tokyo (JP)

(72) Inventors: Masahiro Mohri, Utsunomiya (JP); Junji Uehara, Utsunomiya (JP); Hiromichi Yoshida, Utsunomiya (JP); Kenichiro Ueda, Utsunomiya (JP); Shinya Watanabe, Shioya-Gun (JP); Akiji Ando, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 286 days.

(21) Appl. No.: 14/096,459

(22) Filed: Dec. 4, 2013

(65) Prior Publication Data

US 2014/0162151 A1    Jun. 12, 2014

(30) Foreign Application Priority Data

Dec. 7, 2012  (JP) ................................. 2012-268268
Nov. 8, 2013  (JP) ................................. 2013-232365

(51) Int. Cl.
*H01M 8/04* (2016.01)
*H01M 8/10* (2016.01)

(52) U.S. Cl.
CPC ...... *H01M 8/04835* (2013.01); *H01M 8/04492* (2013.01); *H01M 8/04641* (2013.01); *H01M 2008/1095* (2013.01); *Y02E 60/50* (2013.01)

(58) Field of Classification Search
CPC ................... H01M 8/04835; H01M 8/04492; H01M 8/04641

USPC .......................................................... 429/413
See application file for complete search history.

(56) References Cited

U.S. PATENT DOCUMENTS

| 2003/0141188 | A1  | 7/2003  | Imamura et al.              |
| 2004/0151956 | A1* | 8/2004  | Orihashi ........... H01M 8/04246 429/432 |
| 2006/0166058 | A1  | 7/2006  | Kudo                        |
| 2009/0169934 | A1  | 7/2009  | Manabe et al.               |
| 2011/0053014 | A1* | 3/2011  | Yumita ............. H01M 8/04097 429/415 |
| 2011/0269046 | A1  | 11/2011 | Suematsu                    |

FOREIGN PATENT DOCUMENTS

| JP | 07-235324 A   | 9/1995  |
| JP | 2002-367650 A | 12/2002 |
| JP | 2003-086220 A | 3/2003  |
| JP | 2003-297408 A | 10/2003 |
| JP | 2004-241236 A | 8/2004  |
| JP | 2006-210004 A | 8/2006  |

(Continued)

*Primary Examiner* — Karie O'Neill Apicella
(74) *Attorney, Agent, or Firm* — Carrier Blackman & Associates, P.C.; Joseph P. Carrier; Jingli Wang (57) ABSTRACT

A humidification control method includes the steps of detecting a direct current resistance component by measuring impedance during power generation of a fuel cell stack, calculating a reaction resistance component based on the detected direct current resistance component and a stack voltage, detecting a humidified state of the fuel cell stack based on the detected direct current resistance component and the calculated reaction resistance component, and adjusting a quantity of humidification of a reaction gas supplied to the fuel cell stack based on the detected humidified state of the fuel cell stack.

13 Claims, 10 Drawing Sheets

(56) References Cited

FOREIGN PATENT DOCUMENTS

| JP | 2007-012419 A | 1/2007 |
| JP | 2007-335220 A | 12/2007 |
| JP | 2010-135290 A | 6/2010 |
| JP | 2013-109949 A | 6/2013 |
| JP | 2013-178911 A | 9/2013 |
| WO | 2010/082453 A1 | 7/2010 |

* cited by examiner

HUMIDIFICATION CONTROL METHOD FOR FUEL CELL

CROSS-REFERENCE TO RELATED APPLICATIONS

This application is based upon and claims the benefit of priority from Japanese Patent Applications No. 2012-268268 filed on Dec. 7, 2012 and No. 2013-232365 filed on Nov. 8, 2013, the contents all of which are incorporated herein by reference.

BACKGROUND OF THE INVENTION

1. Field of the Invention

The present invention relates to a humidification control method for a fuel cell formed by stacking an electrolyte electrode assembly and a separator. The electrolyte electrode assembly includes an anode, a cathode, and an electrolyte interposed between the anode and the cathode.

2. Description of the Related Art

For example, a solid polymer electrolyte fuel cell employs a polymer ion exchange membrane as an electrolyte membrane (electrolyte). The polymer electrolyte membrane is interposed between an anode and a cathode to form a membrane electrode assembly (MEA). The membrane electrode assembly and a pair of separators sandwiching the membrane electrode assembly make up a fuel cell. A plurality of fuel cells are stacked together to form a fuel cell stack, e.g., mounted in a vehicle.

In the fuel cell, in order to perform the reliable power generation, it is required to correctly keep track of the power generation condition. For example, the electrolyte membrane needs to be humidified to achieve the desired humidified state for maintaining the power generation performance. If the electrolyte membrane is dried, the power generation performance is degraded.

If the quantity of the water produced in power generation is large, and the water is excessively present in the fuel cell, flooding may occur undesirably. Therefore, clogging occurs in channels for reactant gases to degrade the power generation performance. Further, in some cases, the power generation performance may be degraded due to the insufficient supply of the fuel gas.

In this regard, the quantity of water in the fuel cell can be measured by measuring impedance of the fuel cell. For example, an alternating current impedance method has been adopted. In this method, the impedance is measured at a large number of points while changing the applied sinusoidal frequency.

However, in the alternating impedance method of this type, it takes a considerable time to perform one measurement. Therefore, it is difficult to detect the state of water content (humidified state) within the fuel cell in real time, disadvantageously.

In this regard, for example, a fuel cell system disclosed in Japanese Laid-Open Patent Publication No. 2003-086220 is known. The fuel cell system includes a fuel cell capable of obtaining electrical energy generated by electrochemical reactions of hydrogen and oxygen. In a case where a sinusoidal wave signal is applied to the output signal of the fuel cell while changing the frequency, complex number impedance of the fuel cell is used to obtain resistance component which increases when shortage of the water quantity within the fuel cell occurs and the resistance component which increases when the water quantity within the fuel cell is excessive. Based on the resistance components, the state of water content within the fuel cell is estimated.

The fuel cell system includes a sinusoidal wave applying means for applying a sinusoidal wave signal having an arbitral frequency to an output signal of the fuel cell, voltage detection means for detecting the output voltage of the fuel cell, current detection means for detecting the output current of the fuel cell, and impedance computation means. In a case where a sinusoidal wave signal at a predetermined frequency is applied to the output signal of the fuel cell by the sinusoidal wave applying means, complex number impedance of the fuel cell at the predetermined frequency is calculated based on the output voltage detected by the voltage detection means and the output current detected by the current detection means.

The impedance computation means calculates the complex number impedance of the fuel cell at one frequency at least, and based on the complex number impedance of the fuel cell at the at least one frequency, calculates the complex number impedance of the fuel cell in a case where a sinusoidal wave signal is applied while changing the frequency.

SUMMARY OF THE INVENTION

In Japanese Laid-Open Patent Publication No. 2003-086220, using impedances at two different frequencies, complex number impedance in a case where the frequency is changed from a high frequency ($\omega=\infty$) to a low frequency ($\omega=0$) is estimated to determine the resistance component which increases when shortage of the water quantity within the fuel cell occurs and the resistance component which increases when the water quantity within the fuel cell is excessive.

Therefore, the control for detection of the resistance components is complicated disadvantageously. Further, in Cole-Cole Plot where the trajectory of the complex number impedance at each frequency is plotted, the trajectory of the complex number impedance may not form a semicircular shape accurately. In such a situation, Japanese Laid-Open Patent Publication No. 2003-086220 has a problem where the resistance components cannot be determined correctly.

The present invention has been made to solve problems of this type, and an object of the present invention is to provide a humidification control method for a fuel cell where direct current resistance component can be detected reliably with a high degree of accuracy by measurement of impedance, and humidification control of the fuel cell can be performed rapidly and easily.

The present invention relates to a humidification control method for a fuel cell formed by stacking an electrolyte electrode assembly and a separator. The electrolyte electrode assembly includes an anode, a cathode, and an electrolyte interposed between the anode and the cathode.

This humidification control method includes the steps of detecting a direct current resistance component by measuring impedance within an area of an electrode reaction surface during power generation of the fuel cell, calculating a reaction resistance component based on the detected direct current resistance component and a stack voltage, detecting a humidified state of the fuel cell based on the detected direct current resistance component and the calculated reaction resistance component, and adjusting a quantity of humidification of a reaction gas supplied to the fuel cell based on the detected humidified state of the fuel cell.

In the present invention, during power generation in the fuel cell, impedance is measured to detect direct current resistance component. Then, since the reaction resistance component is calculated based on the detected direct current resistance component and the stack voltage, it is not required to sweep the alternating current frequency in a wide frequency range from a high frequency to a low frequency. Therefore, the process of measuring impedance can be performed rapidly and easily.

Accordingly, the direct current resistance component can be detected with a high degree of accuracy reliably by measurement of impedance, and it becomes possible to implement humidification control of the fuel cell rapidly and easily.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
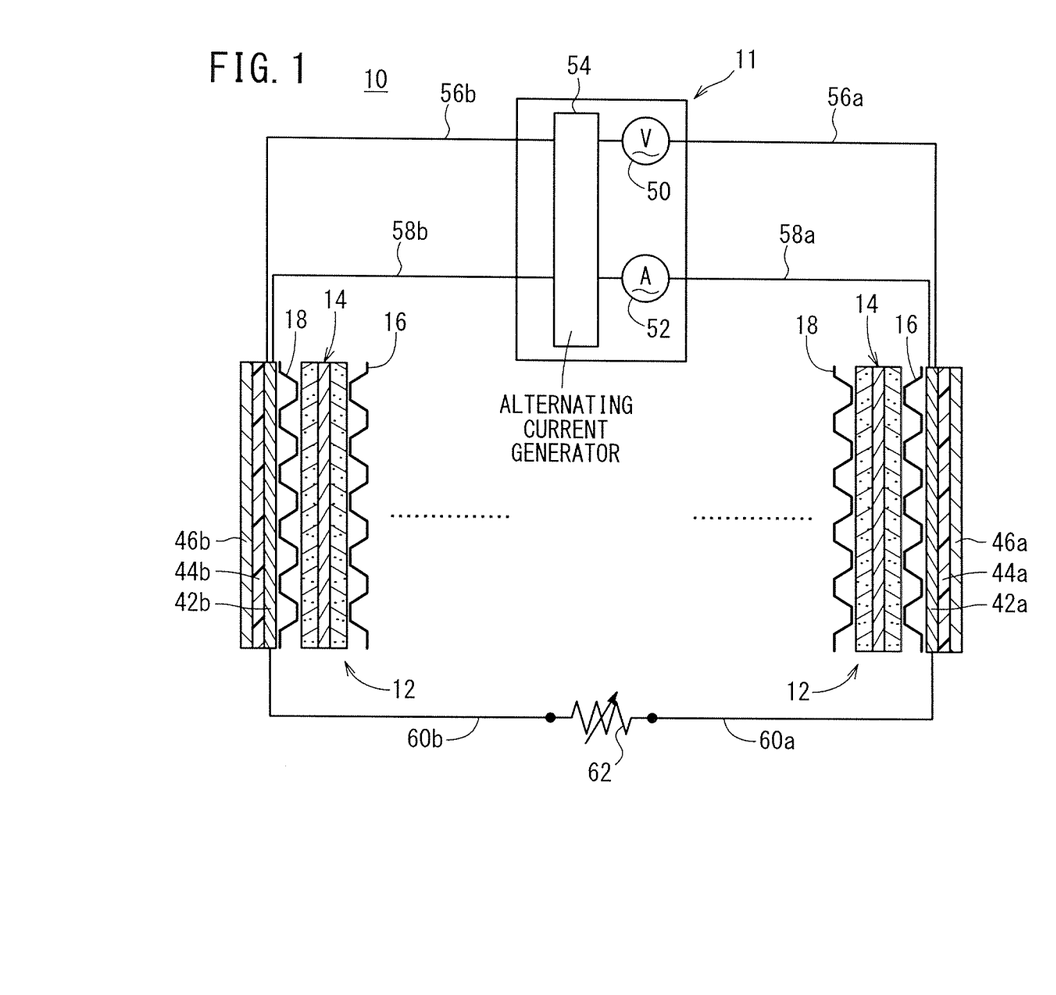
FIG. 1 is a diagram showing main components of a fuel cell stack to which a humidification control method according to an embodiment of the present invention is applied.

As shown in FIG. 1, a fuel cell stack 10 to which a humidification control method according to an embodiment of the present invention is applied is formed by stacking a plurality of fuel cells 12, and the fuel cell stack 10 is mounted in a vehicle, for example. Electrical current (alternating current) for impedance measurement flows through at least one of the fuel cells 12, and impedance measurement is performed by an impedance measuring apparatus 11.

The impedance measurement may be performed in a certain fuel cell 12 in a stacking direction, or may be performed in a plurality of the fuel cells 12 connected electrically in series.

Figure 2:
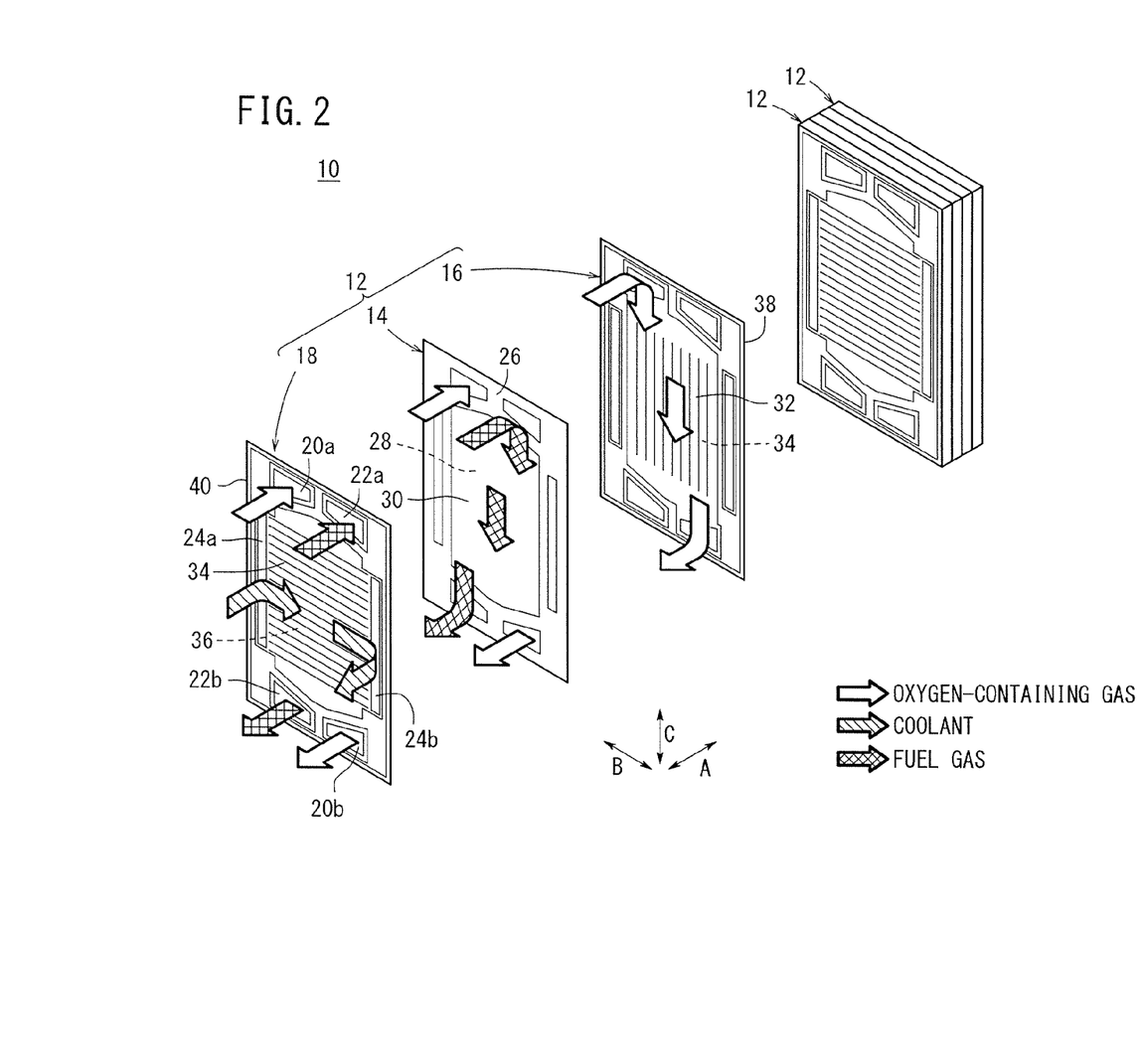
FIG. 2 is an exploded perspective view showing main components of the fuel cell stack.

As shown in FIG. 2, the fuel cell 12 includes a membrane electrode assembly (electrolyte electrode assembly) 14 and a first separator 16 and a second separator 18 sandwiching the membrane electrode assembly 14. At one end (upper end) of the fuel cell 12 in a vertical direction indicated by an arrow C in FIG. 2, an oxygen-containing gas supply passage 20a for supplying an oxygen-containing gas and a fuel gas supply passage 22a for supplying a fuel gas such as a hydrogen-containing gas are arranged in a horizontal direction indicated by an arrow B. The oxygen-containing gas supply passage 20a and the fuel gas supply passage 22a extend through the fuel cells 12 in the stacking direction indicated by an arrow A.

At the other end (lower end) of the fuel cells 12 in the direction indicated by the arrow C, a fuel gas discharge passage 22b for discharging the fuel gas and an oxygen-containing gas discharge passage 20b for discharging the oxygen-containing gas are arranged in the direction indicated by the arrow B. The fuel gas discharge passage 22b and the oxygen-containing gas discharge passage 20b extend through the fuel cells 12 in the direction indicated by the arrow A.

At one end of the fuel cells 12 in the direction indicated by the arrow B, a coolant supply passage 24a for supplying a coolant is provided, and at the other end of the fuel cells 12 in the direction indicated by the arrow B, a coolant discharge passage 24b for discharging the coolant are provided.

The membrane electrode assembly 14 includes a cathode 28, an anode 30, and a solid polymer electrolyte membrane 26 interposed between the cathode 28 and the anode 30. The solid polymer electrolyte membrane 26 is formed by impregnating a fluorine based ion exchange membrane or a hydrocarbon based ion exchange membrane with water, for example.

Each of the cathode 28 and the anode 30 has an electrode catalyst layer and a gas diffusion layer such as a carbon paper on the electrode catalyst layer. The electrode catalyst layer is formed by porous carbon particles supporting platinum alloy thereon and ion-exchange components. The porous carbon particles and the ion-exchange components are deposited uniformly on the surface of the solid polymer electrolyte membrane 26. Thus, the electrode catalyst layer of the cathode 28 and the electrode catalyst layer of the anode 30 are fixed to both surfaces of the solid polymer electrolyte membrane 26, respectively.

The first separator 16 and the second separator 18 are metal separators or carbon separators. The first separator 16 has an oxygen-containing gas flow field 32 on its surface facing the membrane electrode assembly 14. The oxygen-containing gas flow field 32 extends in the direction indicated by the arrow C to connect the oxygen-containing gas supply passage 20a and the oxygen-containing gas discharge passage 20b. The first separator 16 has a coolant flow field 34 on its surface opposite to the oxygen-containing gas flow field 32. The coolant flow field 34 extends in the direction indicated by the arrow B to connect the coolant supply passage 24a and the coolant discharge passage 24b.

The second separator 18 has a fuel gas flow field 36 on its surface facing the membrane electrode assembly 14. The fuel gas flow field 36 extends in the direction indicated by the arrow C to connect the fuel gas supply passage 22a and the fuel gas discharge passage 22b. Likewise, the second separator 18 has the coolant flow field 34 on its surface opposite to the fuel gas flow field 36.

A first seal member 38 and a second seal member 40 are formed integrally with the first separator 16 and the second separator 18, respectively, or seal members separate from the first separator 16 and the second separator 18 may be provided as the first seal member 38 and the second seal member 40 on the first separator 16 and the second separator 18, respectively, for preventing leakage of the fuel gas, the oxygen-containing gas, and the coolant. Each of the first seal member 38 and the second seal member 40 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, in the fuel cell stack 10, at one end of the fuel cells 12 in the stacking direction, a terminal plate 42a, an insulating plate 44a, and an end plate 46a are stacked. At the other end of the fuel cells 12 in the stacking direction, a terminal plate 42b, an insulating plate 44b, and an end plate 46b are stacked.

An impedance measuring apparatus 11 includes an AC voltage measuring instrument 50, an AC current measuring instrument 52, and an alternating current generator 54. One end of a voltage cable 56a and one end of a current cable 58a are connected to the terminal plate 42a. The other end of the voltage cable 56a is connected to the AC voltage measuring instrument 50, and the other end of the current cable 58a is connected to the AC current measuring instrument 52.

One end of a voltage cable 56b and one end of a current cable 58b are connected to the terminal plate 42b. The other end of the voltage cable 56b is connected to the AC voltage measuring instrument 50, and the other end of the current cable 58b is connected to the AC current measuring instrument 52.

One end of an external cable 60a is connected to the terminal plate 42a, and one end of an external cable 60b is connected to the terminal plate 42b. An external load 62 is connected to the other end of the external cable 60a and the other end of the external cable 60b. The fuel cell stack 10 outputs direct current to the external load 62. The direct current and the alternating current may be superimposed for measuring the impedance. Though not shown, for example, a traction motor for use in a vehicle, a compressor for supplying the air to the fuel cells 12 or the like may be used as the external load 62.

Operation of the fuel cell stack 10 will be described in relation to the humidification control method according to the embodiment of the present invention.

Figure 3:
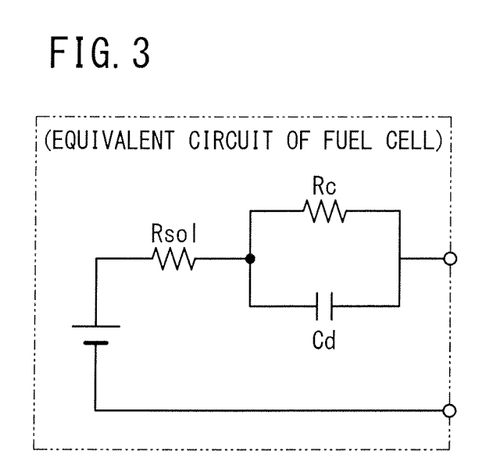
FIG. 3 is a diagram showing an equivalent circuit of a fuel cell of the fuel cell stack.

Firstly, FIG. 3 shows an equivalent circuit of the fuel cell 12. In FIG. 3, Rsol denotes a direct current resistance component including the resistance of the solid polymer electrolyte membrane 26, the penetration resistance of the members, and the contact resistance. Rc denotes a reaction resistance component including activation overpotential and concentration overpotential. Cd denotes an electric double layer capacitance.

Figure 4:
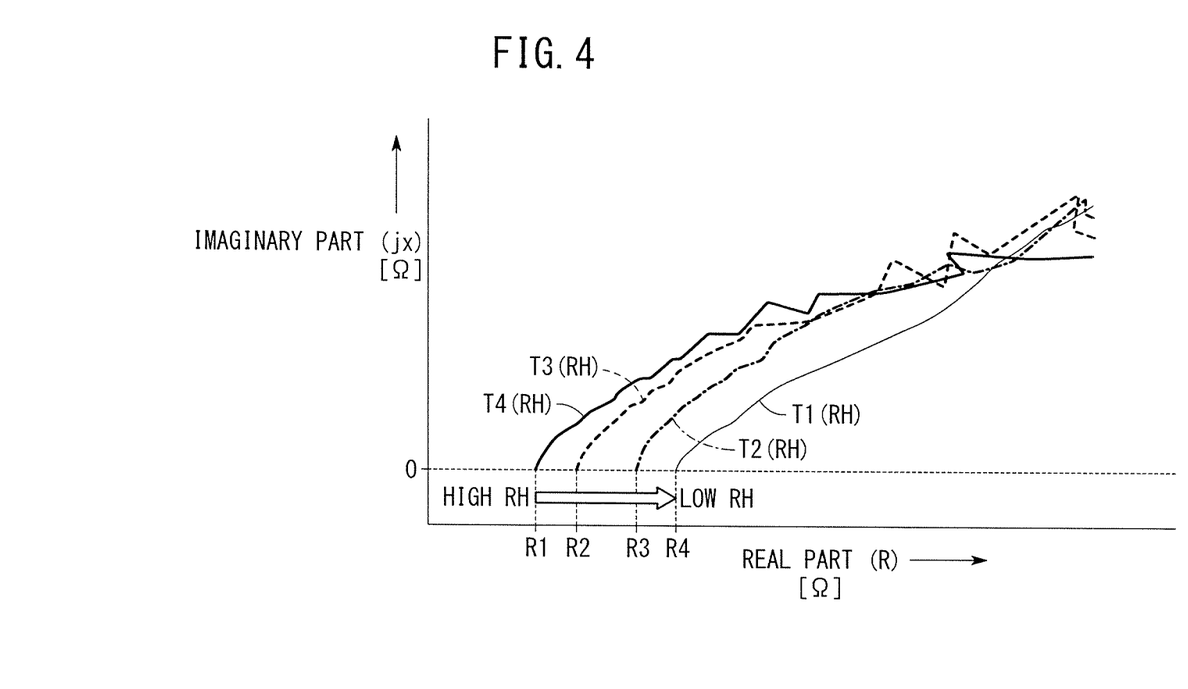
FIG. 4 is a graph illustrating Cole-Cole Plot showing impedances where water content ratios are changed.

FIG. 4 illustrates Cole-Cole Plot showing the impedances of the fuel cell 12 in a complex plane in a case where sinusoidal current on the high frequency side is applied to change the frequency in the equivalent circuit of the fuel cell 12 shown in FIG. 3. In FIG. 4, impedances in cases of adopting different water content ratios of the solid polymer electrolyte membrane 26 are shown. Specifically, the humidity of the supplied oxygen-containing gas is changed while a constant current flows. In the cases at a relative humidity T1 (RH) (e.g., 5%), at a relative humidity T2 (RH) (e.g., 10%), at a relative humidity T3 (RH) (e.g., 50%), and at a relative humidity T4 (RH) (e.g., 90%) (T1<T2<T3<T4), different impedance characteristics are measured and thereby respective resistances R4, R3, R2, and R1 are obtained as direct current resistance components.

The resistances R1, R2, R3, and R4 represent impedances of the cases where the frequency of the applied sinusoidal current is infinite ($\omega=\infty$), and correspond to Rsol in FIG. 3. Though not shown, the impedances of the cases where the frequency of the applied sinusoidal current is very small ($\omega=0$) correspond to Rsol+Rc.

The resistance R2 is larger than the resistance R1, the resistance R3 is larger than the resistance R2, and the resistance R4 is larger than the resistance R3 (R1<R2<R3<R4). That is, the impedances depend on the water content ratios of the solid polymer electrolyte membrane 26. The resistance has a smaller value at a higher humidity (high RH) of the supplied reaction gas, and has a larger value at a lower humidity (low RH).

Figure 5:
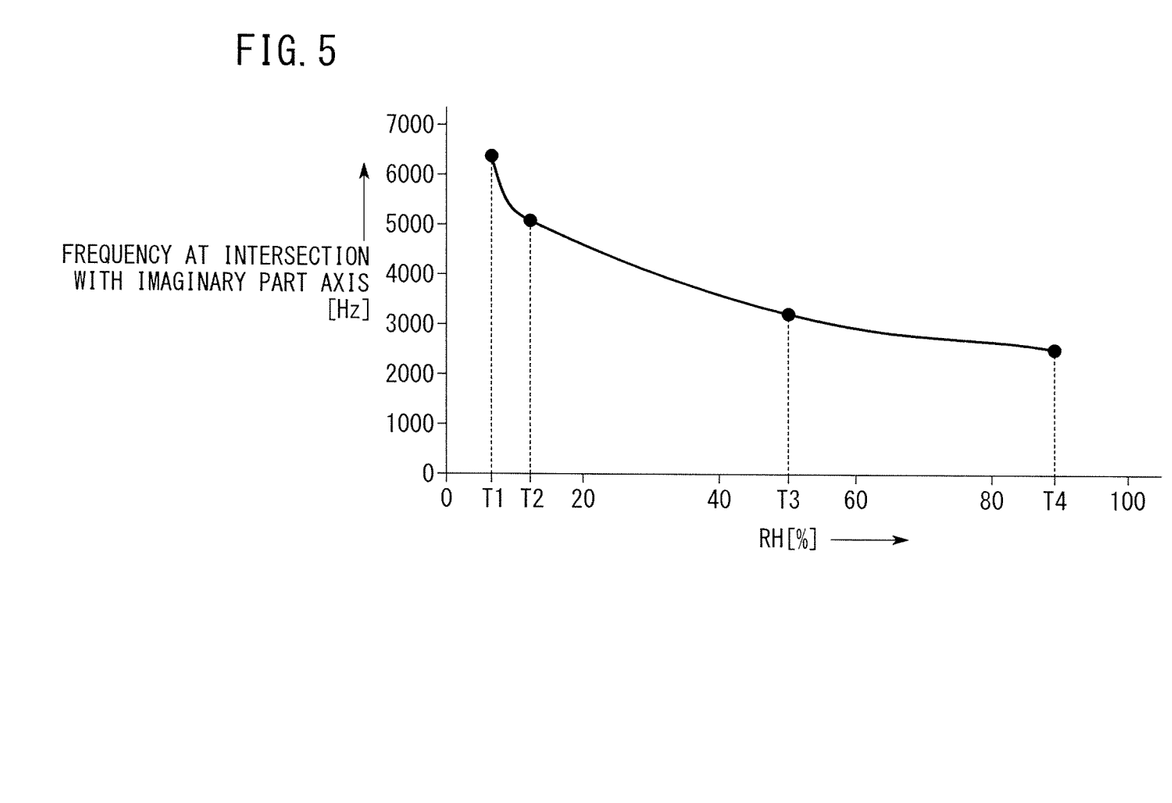
FIG. 5 is a graph showing the frequency at the intersection of the real part axis and the imaginary part axis depending on the humidity.

As shown in FIG. 5, the frequency at the intersection with the imaginary part axis=0 (intersection frequency) changes depending on the humidity. Specifically, as the humidity decreases, the intersection frequency is shifted to the high frequency side. Thus, in the embodiment of the present invention, in order to reliably keep track of the water content state of the solid polymer electrolyte membrane 26 based on the direct current resistance component, the swept alternating current frequency is limited within a range between 1 kHz and 10 kHz such that it passes the intersection with the imaginary part axis=0. The intersection frequency with the imaginary part axis tends to be lower as the current that is output from the fuel cell stack 10 becomes larger.

Figure 6:
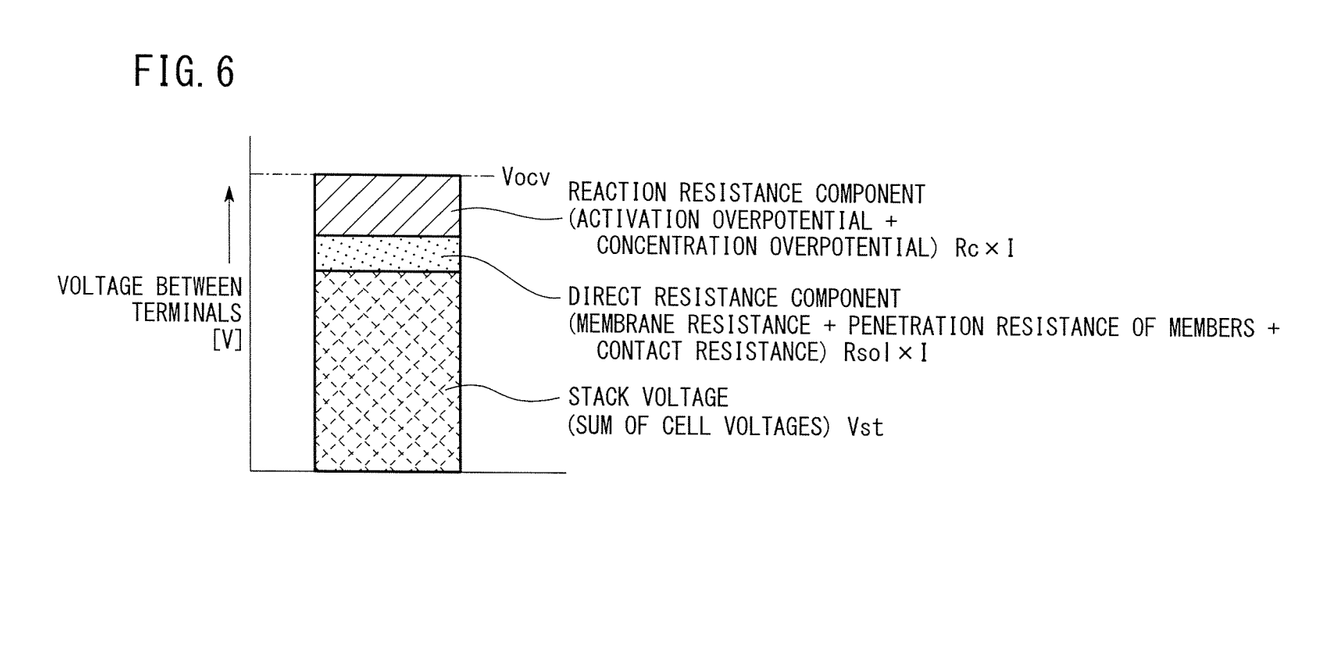
FIG. 6 is a graph showing the voltage between terminals.

The voltage between the terminals of the fuel cell stack 10 is shown in FIG. 6. A voltage Vocv (constant value) denoted as the stack theoretical voltage OCV (open circuit voltage) at a predetermined temperature is the sum of the stack voltage (sum of voltages of the cells) Vst, direct current resistance component Rsol×I (current), and the reaction resistance component Rc×I (current). Therefore, when the direct current resistance component Rsol is detected, the reaction resistance component Rc can be obtained by calculation.

Further, depending on whether the direct current resistance component Rsol and the reaction resistance component Rc are high or low, the water content state (humidified state) of the solid polymer electrolyte membrane 26 is determined. Specifically, if the direct current resistance component Rsol is high and the reaction resistance component Rc is high, it is determined that the solid polymer electrolyte membrane 26 is dried (dried up). Further, if the direct current resistance component Rsol is high and the reaction resistance component Rc is low, it is determined that the solid polymer electrolyte membrane 26 is not sufficiently humidified. Further, if the direct current resistance component Rsol is low and the reaction resistance component Rc is high, it is determined that the water in the solid polymer electrolyte membrane 26 is excessive (flooding).

Next, operation of the fuel cell stack 10 will be described below. As shown in FIG. 2, an oxygen-containing gas is supplied to the oxygen-containing gas supply passage 20a, and a fuel gas such as a hydrogen containing gas is supplied to the fuel gas supply passage 22a. Further, a coolant such as pure water, ethylene glycol, or oil is supplied to the coolant supply passage 24a.

The oxygen-containing gas flows into each oxygen-containing gas flow field 32 of the first separator 16, and moves along the cathode 28 of the membrane electrode assembly 14 for inducing an electrochemical reaction at the cathode 28. In the meanwhile, the fuel gas supplied to the fuel gas supply passage 22a flows into each fuel gas flow field 36 of the second separator 18, and moves along the anode 30 of the membrane electrode assembly 14 for inducing an electrochemical reaction at the anode 30.

Thus, in each of the membrane electrode assemblies 14, the oxygen-containing gas supplied to the cathode 28, and the fuel gas supplied to the anode 30 are partially consumed in the electrochemical reactions at electrode catalyst layers for generating electricity. The oxygen-containing gas partially consumed at the cathode 28 is discharged into the oxygen-containing gas discharge passage 20b. Likewise, the fuel gas partially consumed at the anode 30 is discharged into the fuel gas discharge passage 22b.

Further, the coolant supplied to the coolant supply passage 24a flows into each coolant flow field 34 of the first separator 16 and the second separator 18. After the coolant cools the membrane electrode assembly 14, the coolant is discharged into the coolant discharge passage 24b.

At the time of power generation as describe above, as shown in FIG. 1, the impedance measuring apparatus 11 is configured to output direct current from the fuel cell stack 10 by the external load 62, and apply alternating current to the fuel cells 12 for impedance measurement. Thus, impedance measurement is performed.

At this time, the alternating current frequency is swept only in the range between 1 kHz and 10 kHz by the alternating current generator 54 to detect the direct current resistance component Rsol. Then, as shown in FIG. 6, based on the detected direct current resistance component Rsol and the stack voltage (sum of voltages of the cells) Vst, the reaction resistance component Rc is calculated. Specifically, the reaction resistance component Rc is calculated using the equation: $Rc=(Vocv-Vst-Rsol \times I)/I$ where the voltage Vocv represents the sum of each of the theoretical voltages OCV of the fuel cells 12.

Figure 7:
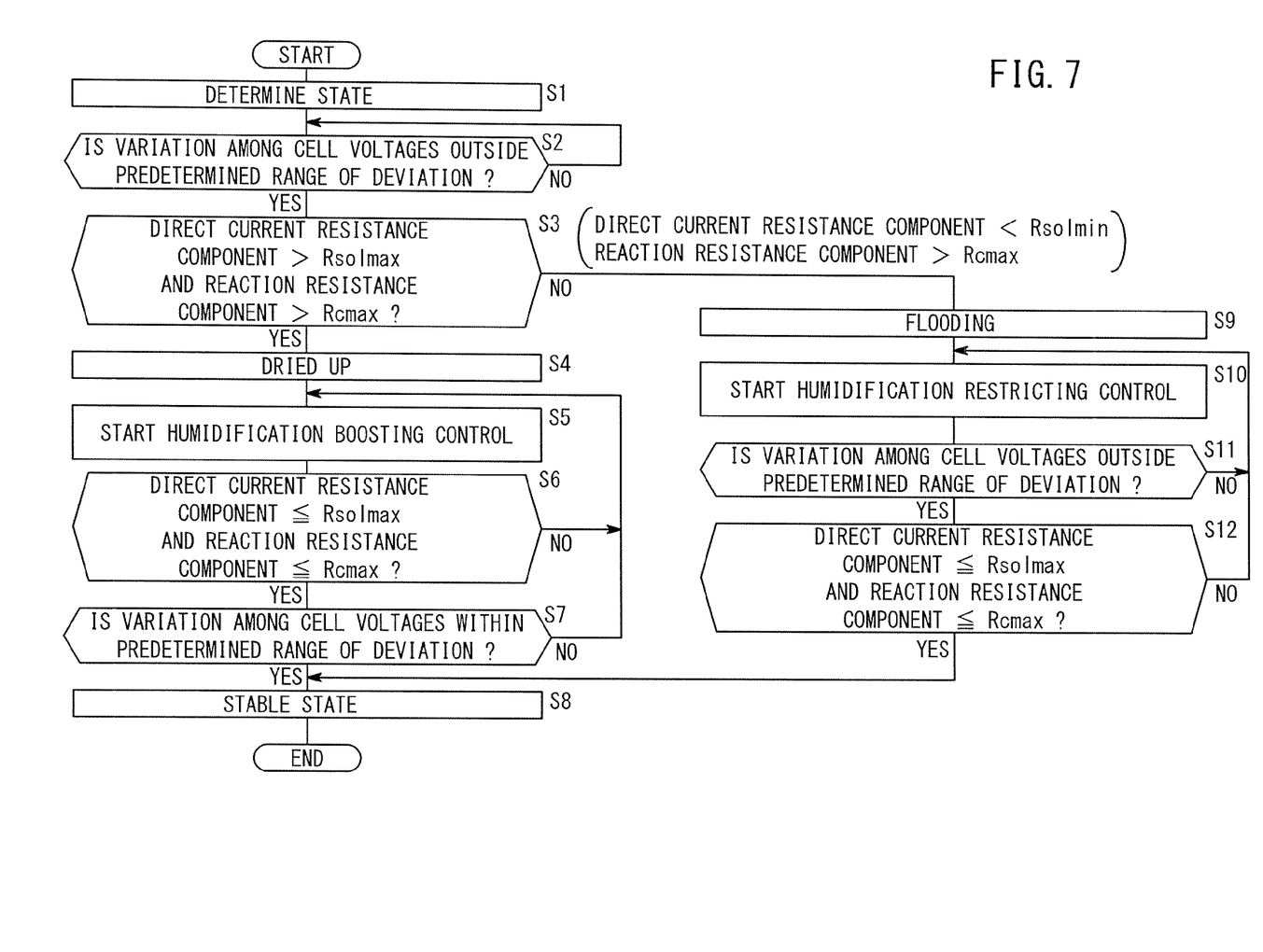
FIG. 7 is a flow chart illustrating the humidification control method according to the embodiment of the present invention.

Then, the process of determining the humidified state of the fuel cell stack 10 is started (see step S1 in FIG. 7). During power generation of the fuel cell stack 10, it is determined whether variation among the output voltages (cell voltages) from the fuel cells 12 is within a predetermined range of deviation. If it is determined that variation among the cell voltages is outside the predetermined range of deviation (YES in step S2), the routine proceeds to step S3. When the variation among the cell voltages is within the predetermined range of deviation, the standard deviation of the variation falls within a prescribed range, and the fuel cell stack 10 can continuously perform stable power generation.

If the fuel cell stack 10 is operated stably, the variation among the cell voltages is kept within the predetermined range of deviation. If flooding (including clogging due to stagnant water) occurs or the membrane is dried (dried up), the variation among the cell voltages is outside the predetermined range of deviation.

Figure 8:
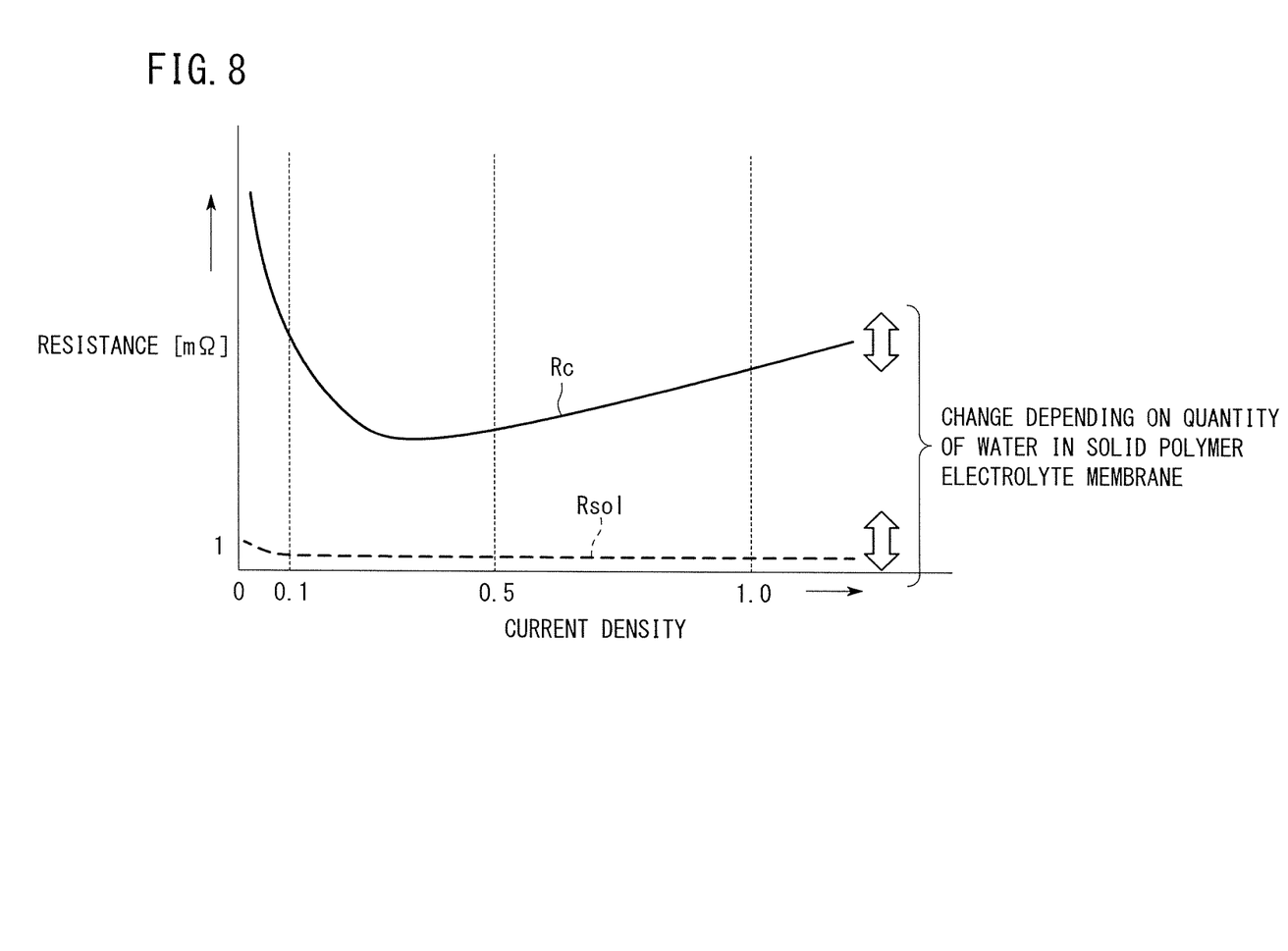
FIG. 8 is a graph showing the relationship between the resistance and the current density.
Figure 9:
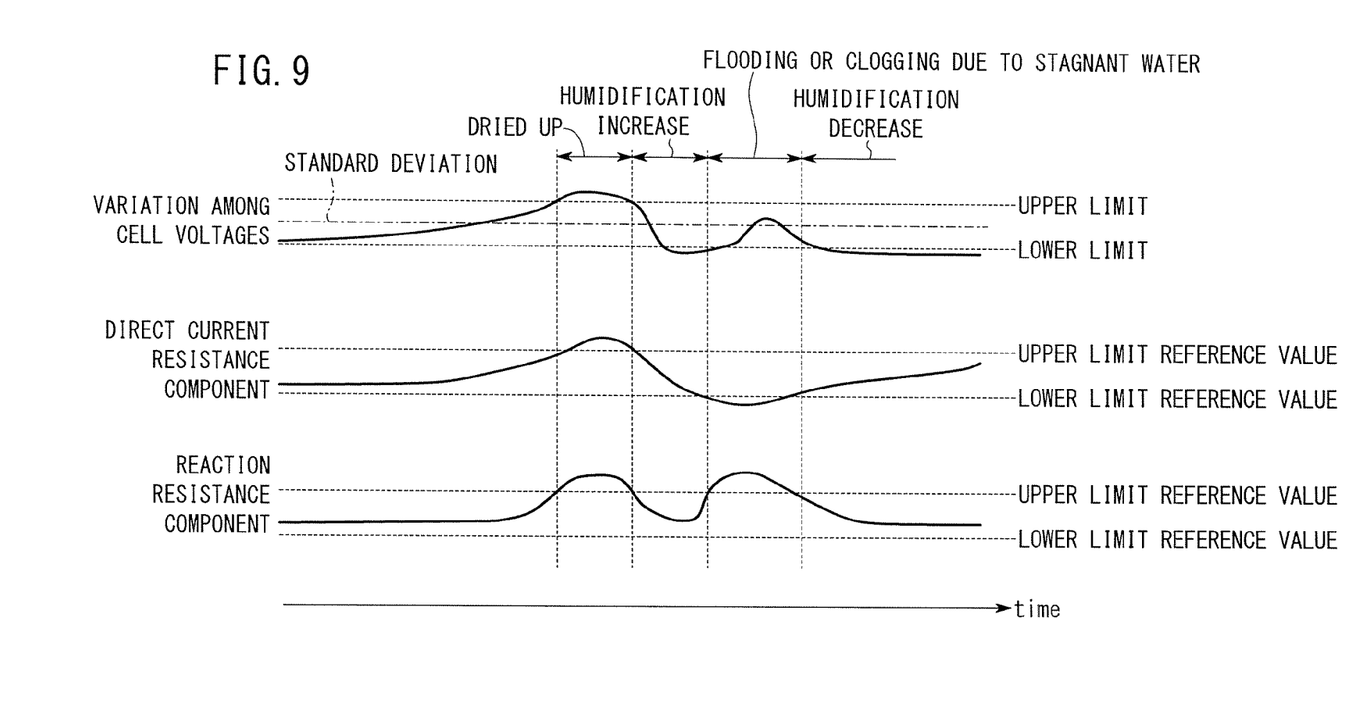
FIG. 9 is a graph showing changes of various control elements.

In this regard, as shown in FIG. 8, the upper limit reference values of the direct current resistance component Rsol and the reaction resistance component Rc are determined for each current density. Further, as shown in FIG. 9, if it is determined that the detected direct current resistance component Rsol has a value exceeding an upper limit reference value (Rsolmax), and the calculated reaction resistance component Rc has a value exceeding the upper limit reference value (Rcmax) (YES in step S3), the routine proceeds to step S4 for detecting that the solid polymer electrolyte membrane 26 is in the dried-up state.

Then, the routine proceeds to step S5 for starting humidification boosting control. In this humidification boosting control, various methods are adopted for increasing a quantity of humidification of the reaction gas. For example, a bypass channel provided in a humidifier (not shown) for humidifying the oxygen-containing gas supplied to the fuel cell stack 10 is closed to increase the flow rate of the oxygen-containing gas supplied to the humidifier, or the oxygen-containing gas or the fuel gas is directly humidified by an injector (not shown) utilizing drain water, etc.

When the humidification boosting control is started, the reaction resistance component Rc becomes lower first. This is caused by the increase of the water content in the ion-exchange components of the electrode catalyst layer. In this state, the solid polymer electrolyte membrane 26 is not sufficiently humidified. As the humidification boosting control is continued, water quantity in the solid polymer electrolyte membrane 26 increases and the direct current resistance component Rsol gradually becomes lower.

If it is determined that the direct current resistance component Rsol is the upper limit reference value (Rsolmax) or less and the reaction resistance component Rc is the upper limit reference value (Rcmax) or less (YES in step S6), the routine proceeds to step S7. In step S7, if it is determined that variation among cell voltages is within the predetermined range of deviation (YES in step S7), the routine proceeds to step S8 for operating the fuel cell stack 10 stably. Further, if determination in any of steps S6 and S7 is NO, the routine returns to step S5 to continue the humidification boosting control.

In step S3, in the case where the direct current resistance component Rsol is less than a lower limit reference value (Rsolmin) and the reaction resistance component Rc exceeds the upper limit reference value (Rcmax), i.e., if the determination is NO, the routine proceeds to step S9. In step S9, it is detected that flooding occurs in the fuel cell stack 10. Then, the routine proceeds to step S10 for starting humidification restricting control. This humidification restricting control is implemented, e.g., by opening the bypass channel provided in the humidifier to decrease the flow rate of the oxygen-containing gas supplied to the humidifier, or by increasing a stoichiometric ratio of the supplied fuel gas. Though not shown, a purge valve provided on a fuel gas circulation channel may be opened.

The routine proceeds to step S11. If it is determined that variation among cell voltages is within the predetermined range of deviation (YES in step S11), the routine proceeds to step S12. In step S12, if it is determined that the direct current resistance component Rsol is the upper limit reference value (Rsolmax) or less, and the reaction resistance component Rc is the upper limit reference value (Rcmax) or less (YES in step S12), the routine proceeds to step S8. Further, in any of steps S11 and S12, if determination is NO, the routine returns to step S10 for continuing the humidification restricting control. Step S12 may be performed prior to step S11.

In the embodiment of the present invention, impedance measurement is performed during power generation of the fuel cell stack 10 to detect the direct current resistance component Rsol. Then, based on the detected direct current resistance component Rsol and the stack voltage Vst, the reaction resistance component Rc is calculated. Specifically, the reaction resistance component Rc is calculated using the equation: $Rc \times I=Vocv-(Vst+Rsol \times I)$.

Therefore, the process of measuring the impedance can be performed rapidly and easily without requiring sweeping of the alternating current frequency in a wide frequency range from the high frequency to the low frequency. In particular, by limiting the swept alternating current frequency within a range between 1 kHz and 10 kHz, it is possible to keep track of the water content state in the solid polymer electrolyte membrane 26 in substantially the entire humidification range (see FIG. 5), and it becomes possible to efficiently perform the process of measuring the impedance.

Therefore, by measuring the impedance, the direct current resistance components Rsol can be detected with a high degree of accuracy reliably. Accordingly, it becomes possible to implement humidification control of the fuel cell stack 10 rapidly and easily.

Further, in the humidification control, firstly, it is determined whether or not variation among the cell voltages is within the predetermined range of deviation. Then, if it is determined that variation among the cell voltages is outside the predetermined range of deviation, the flooding state or the dried-up state of the solid polymer electrolyte membrane 26 is detected. Accordingly, the humidified state of the fuel cell stack 10 can be determined easily, and the humidification control method according to the embodiment of the present invention can be performed efficiently.

Figure 10:
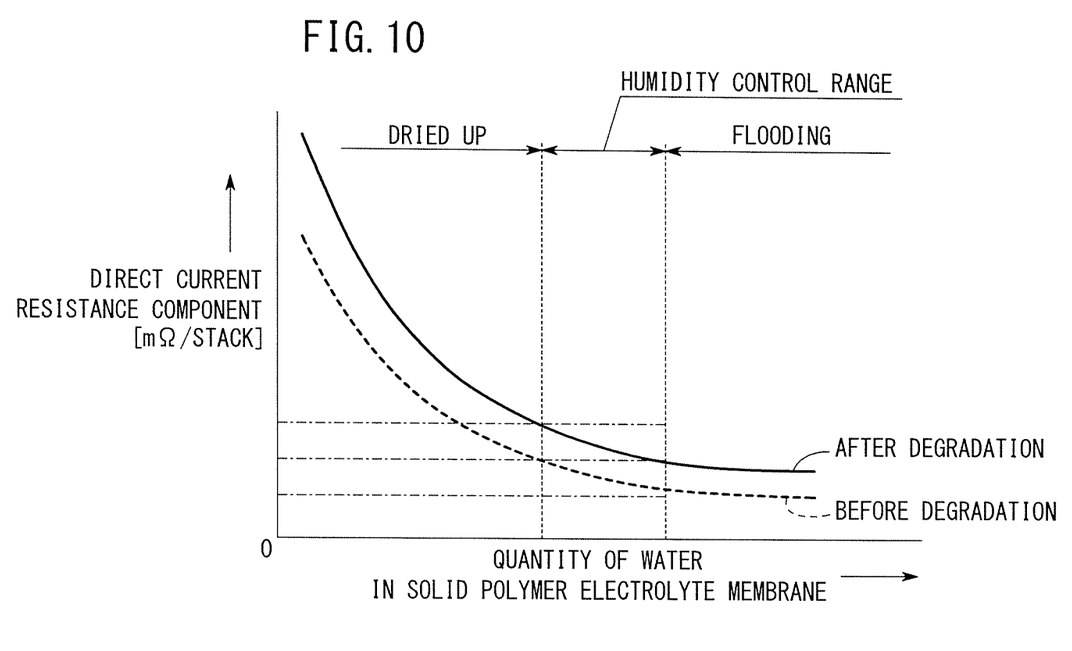
FIG. 10 is a view showing the increase in the direct current resistance component resulting from degradation in the durability.

Further, the durability of the solid polymer electrolyte membrane 26 tends to be degraded when the period used in operation and the total period used in power generation are long. Therefore, as shown in FIG. 10, in the solid polymer electrolyte membrane 26 after degradation of the durability, the direct current resistance component is large in comparison with the initial solid polymer electrolyte membrane 26. Therefore, based on the operating period of the fuel cell stack 10, the amount of increase in the direct current resistance component is estimated in a map, and humidification control is implemented by adding the estimated amount of increase to the upper limit reference value and the lower limit reference value for the detected direct current resistance component. Accordingly, humidification control is performed with a high degree of accuracy advantageously.

While the invention has been particularly shown and described with reference to a preferred embodiment, it will be understood that variations and modifications can be effected thereto by those skilled in the art without departing from the scope of the invention as defined by the appended claims.

What is claimed is:

1. A humidification control method for a fuel cell formed by stacking an electrolyte electrode assembly and a separator, the electrolyte electrode assembly includes an anode, a cathode, and an electrolyte interposed between the anode and the cathode, the method comprising the steps of:
   detecting only a direct current resistance component by measuring an impedance within an area of an electrode reaction surface during power generation of the fuel cell;
   calculating a reaction resistance component based on the detected direct current resistance component and a stack voltage;
   detecting a humidified state of the fuel cell based on the detected direct current resistance component and the calculated reaction resistance component; and
   adjusting a quantity of humidification of a reaction gas supplied to the fuel cell based on the detected humidified state of the fuel cell.

2. The humidification control method according to claim 1, wherein the reaction resistance component is calculated by subtracting the stack voltage and the direct current resistance component from a stack theoretical voltage.

3. The humidification control method according to claim 1, further comprising the step of determining whether or not the direct current resistance component is within a first predetermined range and the reaction resistance component is within a second predetermined range, wherein when it is determined that the direct current resistance component is outside the first predetermined range and the reaction resistance component is outside the second predetermined range, humidification control of the fuel cell is implemented.

4. The humidification control method according to claim 3, wherein when it is determined that the direct current resistance component exceeds the first predetermined range and the reaction resistance component exceeds the second predetermined range, the quantity of humidification of the reaction gas supplied to the fuel cell is increased.

5. The humidification control method according to claim 3, wherein when it is determined that the direct current resistance component is less than the first predetermined range and that the reaction resistance component exceeds the second predetermined range, the quantity of humidification of the reaction gas supplied to the fuel cell is decreased.

6. The humidification control method according to claim 1, wherein at time of measuring the impedance, an alternating current frequency is swept only in a range between 1 kHz and 10 kHz for detection of the direct current resistance component.

7. The humidification control method according to claim 1, further comprising the step of estimating an amount of increase in the direct current resistance component based on an operating period of the fuel cell, wherein humidification control is implemented based on a reference value which includes the estimated amount of increase in the detected direct current resistance component.

8. The humidification control method according to claim 1, wherein the direct current resistance component represents the impedance when a frequency of an alternating current applied to the fuel cell is infinite.

9. The humidification control method according to claim 1, wherein
   the direct current resistance component includes at least one of a resistance of an electrolyte membrane, a penetration resistance of members, and a contact resistance, and wherein the reaction resistance component includes at least one of an activation overpotential and a concentration overpotential.

10. A humidification control method for a fuel cell formed by stacking an electrolyte electrode assembly and a separator, the electrolyte electrode assembly includes an anode, a cathode, and an electrolyte membrane interposed between the anode and the cathode, the method comprising the steps of:
    detecting only a direct current resistance component by measuring an impedance within an area of an electrode reaction surface during power generation of the fuel cell;
    calculating a reaction resistance component based on the detected direct current resistance component, a sum of voltage of the cells, a stack theoretical voltage, and a current;
    determining a humidified state of the fuel cell based on the detected direct current resistance component and the calculated reaction resistance component; and
    adjusting a quantity of humidification of a reaction gas supplied to the fuel cell based on a detected humidified state of the fuel cell,
    wherein:
    the direct current resistance component includes at least one of a resistance of the electrolyte membrane, a penetration resistance of members, and a contact resistance;
    the direct current resistance component represents the impedance when a frequency of an alternating current applied to the fuel cell is infinite;
    the reaction resistance component includes at least one of an activation over potential and a concentration over potential; and
    at time of measuring the impedance, the alternating current frequency is swept only in a range between 1 kHz and 10 kHz for detection of the direct current resistance component.

11. The humidification control method according to claim 10, wherein the reaction resistance component is calculated by subtracting the stack voltage and a product of the direct current resistance component and a current from the stack theoretical voltage to get a voltage value, and then the voltage value is divided by the current.

12. The humidification control method according to claim 10, further comprising the step of
    determining whether the direct current resistance component is within a first defined range between a first lower limit and a first upper limit, and whether the reaction resistance component is within a second defined range between a second lower limit and a second upper limit, wherein when the direct current resistance component exceeds the first upper limit and the reaction resistance exceeds the second upper limit, the quantity of humidification of the reaction gas supplied to the fuel cell is increased, and wherein when the direct current resistance component is less than the first lower limit and the reaction resistance exceeds the second upper limit, the quantity of humidification of the reaction gas supplied to the fuel cell is decreased.

13. The humidification control method according to claim 10, further comprising the step of estimating an amount of increase in the direct current resistance component based on an operating period of the fuel cell, wherein humidification control is implemented based on a reference value which includes the estimated amount of increase in the detected direct current resistance component.

\* \* \* \* \*